(12) United States Patent
Lee

(10) Patent No.: US 8,332,491 B2
(45) Date of Patent: Dec. 11, 2012

(54) NETWORK DEVICE AND PACKET TRANSMISSION METHOD

(75) Inventor: Kuo-Tsai Lee, Hsinchu (TW)

(73) Assignee: Gemtek Technology Co., Ltd. (TW)

( * ) Notice: Subject to any disclaimer, the term of this patent is extended or adjusted under 35 U.S.C. 154(b) by 353 days.

(21) Appl. No.: 12/825,916

(22) Filed: Jun. 29, 2010

(65) Prior Publication Data

US 2011/0225292 A1 Sep. 15, 2011

(30) Foreign Application Priority Data

Mar. 12, 2010 (TW) ................................ 99107261 A

(51) Int. Cl.
G06F 15/177 (2006.01)
G06F 15/173 (2006.01)

(52) U.S. Cl. .................... 709/220; 709/222; 709/224

(58) Field of Classification Search .................. 709/220, 709/222, 224
See application file for complete search history.

(56) References Cited

U.S. PATENT DOCUMENTS

| | | | | |
|---|---|---|---|---|
| 5,948,069 | A * | 9/1999 | Kitai et al. ..................... | 709/240 |
| 6,681,259 | B1 * | 1/2004 | Lemilainen et al. ........... | 709/250 |
| 2002/0072391 | A1 * | 6/2002 | Itoh et al. ....................... | 455/557 |
| 2003/0069947 | A1 * | 4/2003 | Lipinski ......................... | 709/220 |
| 2003/0220110 | A1 * | 11/2003 | Kizu et al. ..................... | 455/445 |
| 2005/0090248 | A1 * | 4/2005 | Shen et al. ................. | 455/432.1 |
| 2005/0091357 | A1 * | 4/2005 | Krantz et al. ................. | 709/223 |
| 2005/0239497 | A1 * | 10/2005 | Bahl et al. .................. | 455/552.1 |
| 2006/0015636 | A1 * | 1/2006 | Skraba et al. .................. | 709/232 |
| 2006/0084417 | A1 * | 4/2006 | Melpignano et al. .......... | 455/418 |
| 2008/0084888 | A1 * | 4/2008 | Yadav et al. .............. | 370/395.31 |
| 2008/0192681 | A1 * | 8/2008 | Lee et al. ....................... | 370/328 |
| 2008/0288620 | A1 * | 11/2008 | Goff et al. ..................... | 709/223 |
| 2010/0115083 | A1 * | 5/2010 | Oba et al. ...................... | 709/224 |
| 2010/0290424 | A1 * | 11/2010 | Collingrige ................... | 370/329 |

OTHER PUBLICATIONS

Jon Inouye, Jim Binkley, Jonathan Walpole "Dynamic Network Reconfiguration Support for Mobile Computers", MobiCom'97, Budapest, Hungary, Sep. 26-30, 1997.*

* cited by examiner

Primary Examiner — Boris Gorney
(74) Attorney, Agent, or Firm — Overhauser Law Offices LLC

(57) ABSTRACT

A network device is adapted to be connected to wired and wireless network interface modules for packet transmission therethrough, and includes a network interface selecting module including a connection status monitoring unit and a network interface selecting unit. The connection status monitoring unit transmits an address resolution protocol (ARP) request packet via the wired network interface module for determining a connection status of the wired network interface module through an ARP response packet received by the network device if the network device is configured with a device internet protocol (IP) address and a default IP address belonging to the same subnet, and transmits an internet control message protocol (ICMP) request packet via the wired network interface module for determining the connection status of the wired network interface module through an ICMP response packet received by the network device if otherwise.

22 Claims, 4 Drawing Sheets

NETWORK DEVICE AND PACKET TRANSMISSION METHOD

CROSS-REFERENCE TO RELATED APPLICATION

This application claims priority of Taiwanese Application No. 099107261, filed on Mar. 12, 2010.

BACKGROUND OF THE INVENTION

1. Field of the Invention

The present invention relates to a packet transmission method, more particularly to a packet transmission method using heterogeneous networks and involving detection of a connection status of a wired network interface module.

2. Description of the Related Art

Referring to FIG. 1, a network device 1, which can be a network router, in a typical network topology is connected to the Internet via a wired network 3 constituted by a local network device 31 and an ethernet network 32, and via a wireless network 4. In such a heterogeneous network configuration, the network device 1 can be implemented with more than one operational mode for utilizing redundancy of the wired and wireless networks in different manners so as to improve reliability and stability, and to meet different needs.

Generally, wireless connection is less affordable than wired connection. Therefore, how to balance packet traffic between the wired and wireless networks 3, 4 is an important consideration in the design of such network devices.

SUMMARY OF THE INVENTION

Therefore, an object of the present invention is to provide a network device adapted for transmitting packets via a wired network interface module and a wireless network interface module. The network device includes wired and wireless network interface ports, and a network interface selecting module.

The wired network interface port is adapted to be connected to the wired network interface module for enabling packet transmission between the network device and a wired network via the wired network interface module. The wireless network interface port is adapted to be connected to the wireless network interface module for enabling packet transmission between the network device and a wireless network via the wireless network interface module. The network interface selecting module includes a connection status monitoring unit and a network interface selecting unit. The connection status monitoring unit is configured to detect a connection status of the wired network interface module. The network interface selecting unit is configured to enable the network device for packet transmission via at least one of the wireless and wired network interface modules according to the connection status as determined by the connection status monitoring unit.

When the connection status monitoring unit determines that the network device is configured with a device internet protocol (IP) address and a default IP address belonging to the same subnet, the connection status monitoring unit broadcasts an address resolution protocol (ARP) request packet via the wired network interface module and determines the connection status through an ARP response packet received by the network device and corresponding to the ARP request packet.

When the connection status monitoring unit determines that the network device is configured with a device IP address and a default IP address that belong to different subnets, the connection status monitoring unit sends an internet control message protocol (ICMP) request packet associated with the default IP address and determines the connection status through an ICMP response packet received by the network device and corresponding to the ICMP request packet.

According to another aspect of the present invention, a network device is adapted for transmitting packets via a wired network interface module, and includes a wired network interface port and a connection status monitoring unit.

The wired network interface port is adapted to be connected to the wired network interface module for enabling packet transmission between the network device and a wired network via the wired network interface module. The connection status monitoring unit is configured to detect a connection status of the wired network interface module.

When the connection status monitoring unit determines that the network device is configured with a device internet protocol (IP) address and a default IP address belonging to the same subnet, the connection status monitoring unit broadcasts an address resolution protocol (ARP) request packet via the wired network interface module and determines the connection status through an ARP response packet received by the network device and corresponding to the ARP request packet.

When the connection status monitoring unit determines that the network device is configured with a device IP address and a default IP address that belong to different subnets, the connection status monitoring unit sends an internet control message protocol (ICMP) request packet associated with the default IP address and determines the connection status through an ICMP response packet received by the network device and corresponding to the ICMP request packet.

Another object of the present invention is to provide a packet transmission method to be implemented by a network device that is connected to a wired network via a wired network interface module and to a wireless network via a wireless network interface module. The packet transmission method includes the steps of:

a) configuring the network device to detect a connection status of the wired network interface module, including a1) when the network device is configured with a device internet protocol (IP) address and a default IP address belonging to the same subnet, configuring the network device to broadcast an address resolution protocol (ARP) request packet via the wired network interface module and to determine the connection status through an ARP response packet received by the network device and corresponding to the ARP request packet, and a2) when the network device is configured with a device IP address and a default IP address that belong to different subnets, configuring the network device to send an internet control message protocol (ICMP) request packet associated with the default IP address and to determine the connection status through an ICMP response packet received by the network device and corresponding to the ICMP request packet; and b) configuring the network device for packet transmission via at least one of the wireless and wired network interface modules according to the connection status determined in step a).

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
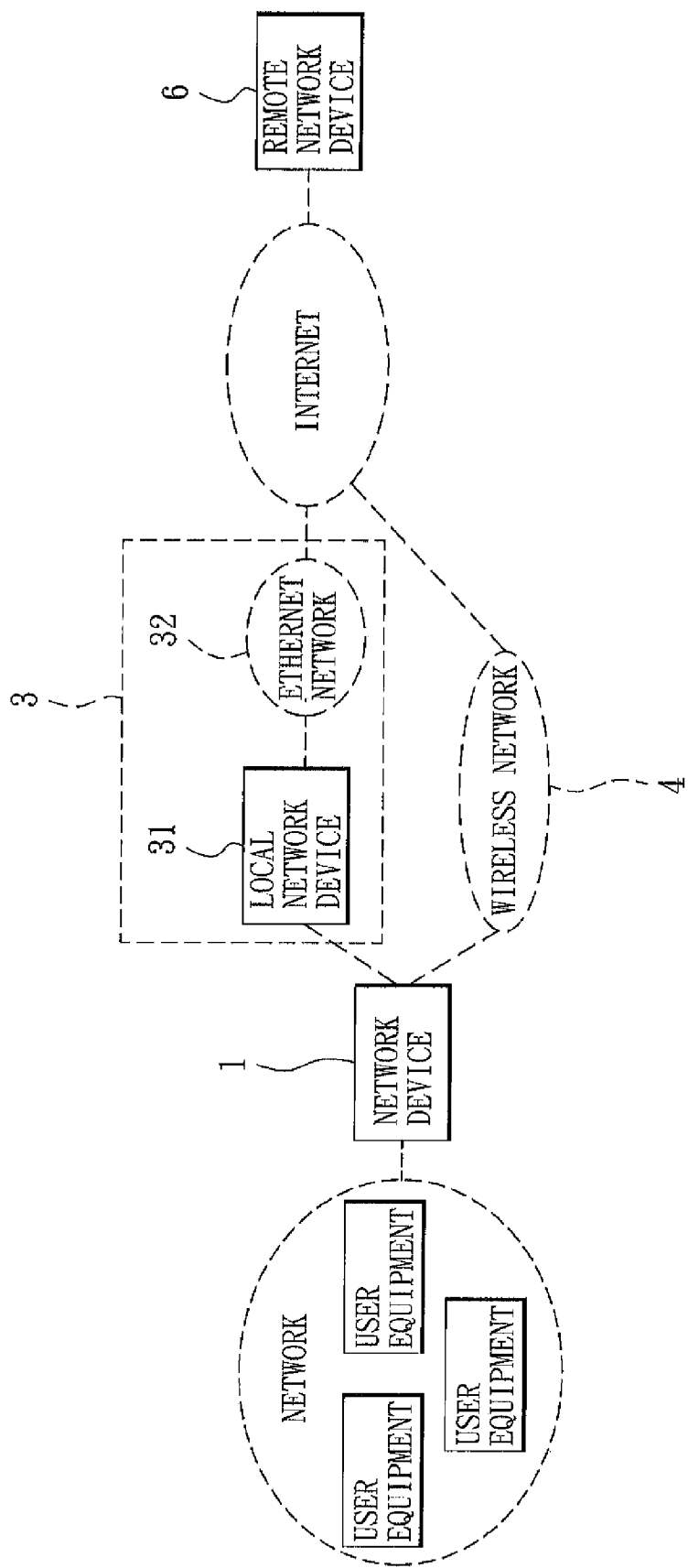
FIG. 1 is a schematic diagram illustrating a typical network topology, in which a network device is connected to the Internet via wired and wireless networks.
Figure 2:
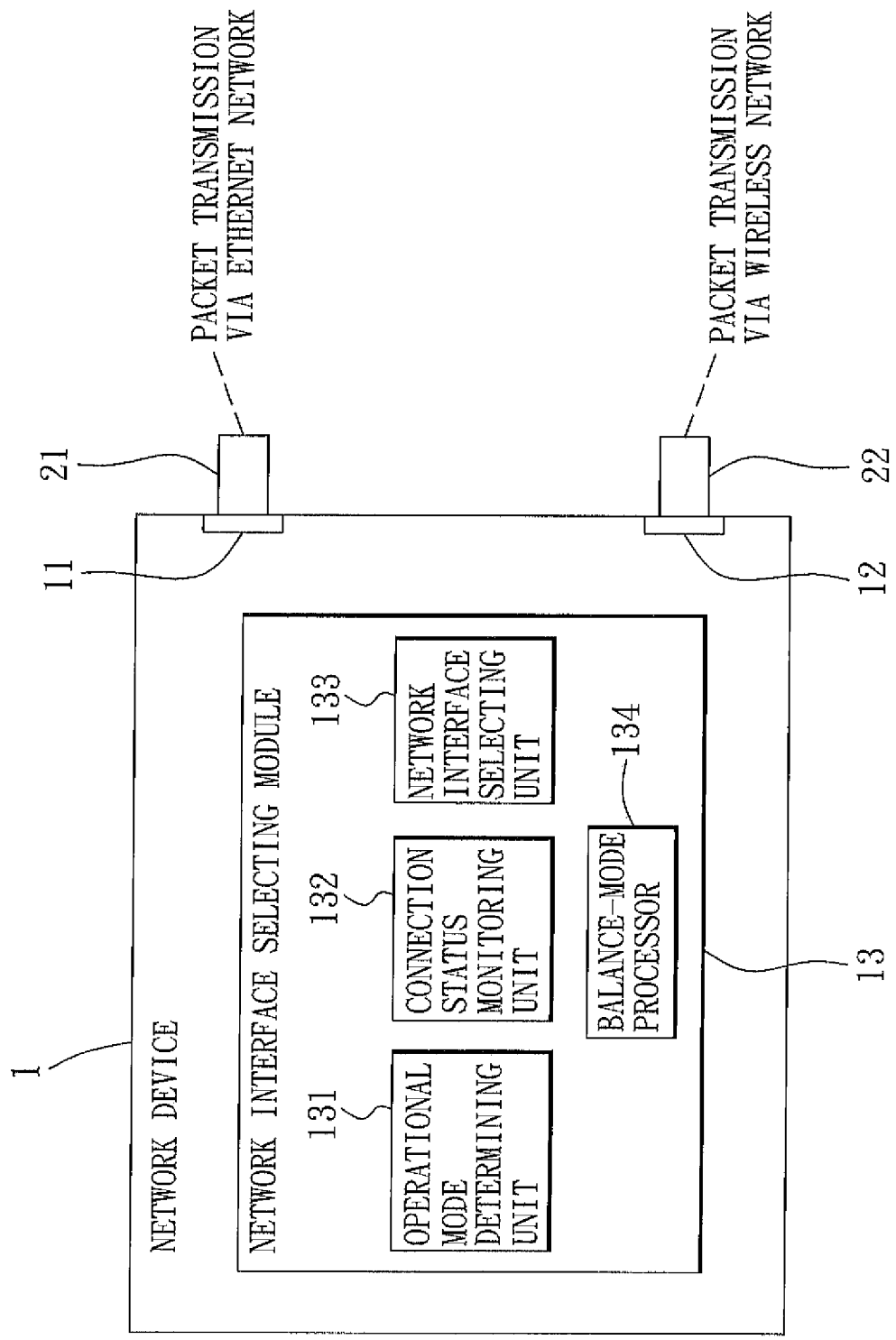
FIG. 2 is a block diagram of the preferred embodiment of a network device according to the present invention.

Referring to FIG. 2, the preferred embodiment of a network device 1 according to the present invention includes: a wired network interface port 11 adapted to be connected to a wired network interface module 21 for enabling packet transmission between the network device 1 and a wired network via the wired network interface module 21; a wireless network interface port 12 adapted to be connected to a wireless network interface module 22 for enabling packet transmission between the network device 1 and a wireless network via the wireless network interface module 22; and a network interface selecting module 13 including an operational mode determining unit 131, a connection status monitoring unit 132, a network interface selecting unit 133, and a balanced-mode processor 134.

The operational mode determining unit 131 is configured to determine an operational mode of the network device 1 according to a user-input operational mode configuration. The connection status monitoring unit 132 is configured to detect a connection status of the wired network interface module 21. The network interface selecting unit 133 is configured to enable the network device 1 for packet transmission via at least one of the wired and wireless network interface modules 21, 22. The balance-mode processor 134 is configured to enable the network device 1 for balanced packet load transmission through the wired network interface module 21 and the wireless network interface module 22 according to a load balancing algorithm and a policy routing scheme.

In the present embodiment, the network device 1 is a network router, the wireless network interface module 22 is an Evolution Data-Optimized (EV-DO) interface module, and the network interface selecting module 13 is realized using a software program (daemon) that can be installed in the network device 1.

Figure 3:
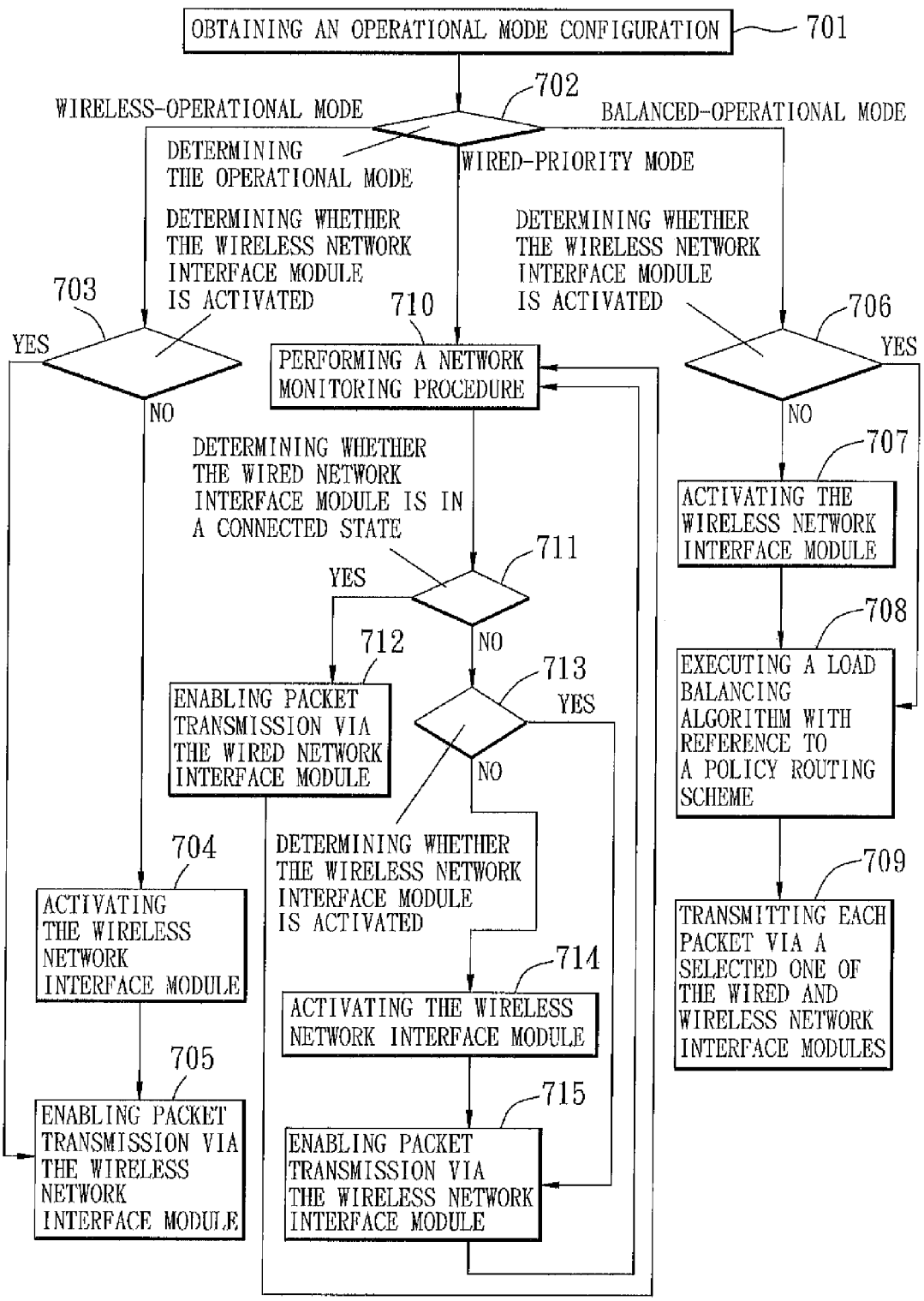
FIG. 3 is a flowchart of the preferred embodiment of a packet transmission method according to the present invention.

Referring to FIG. 3, the network device 1 of the preferred embodiment is operable in one of a wired-priority mode, a wireless-operational mode, and a balanced-operational mode. The operation of the network device 1 in each of the modes will be described hereinafter.

In step 701, the operational mode determining unit 131 obtains the user-input operational mode configuration.

In step 702, the operational mode determining unit 131 determines the operational mode of the network device according to the user-input operational mode configuration.

Wireless-Operational Mode:

In step 703, the network interface selecting module 13 determines whether the wireless network interface module 22 is activated.

In step 704, the network interface selecting module 13 activates the wireless network interface module 22 if the wireless network interface module 22 is not already activated.

In step 705, the network interface selecting unit 133 enables packet transmission via the wireless network interface module 22;

Balanced-Operational Mode:

In step 706, the network interface selecting module 13 determines whether the wireless network interface module 22 is activated;

In step 707, the network interface selecting module 13 activates the wireless network interface module 22 if the wireless network interface module 22 is not already activated;

In step 708, the balanced-mode processor 134 executes the load balancing algorithm with reference to the policy routing scheme.

In step 709, the network device 1 transmits each of to-be-transmitted packets via as elected one of the wired and wireless network interface modules 21, 22 according to a result obtained in step 708. In the present embodiment, the load balancing algorithm is a weighted random algorithm for balancing network load of the network device 1 between the wired and wireless network interface modules 21, 22. In this mode, the wireless network interface module 22 is operable to transmit a portion of the network load according to a user-configured weight ratio ranging between 1% to 99%. The technique of load-balancing is well known to anyone who is skilled in the art, and hence will not be described hereinafter for the sake of brevity.

Figure 4:
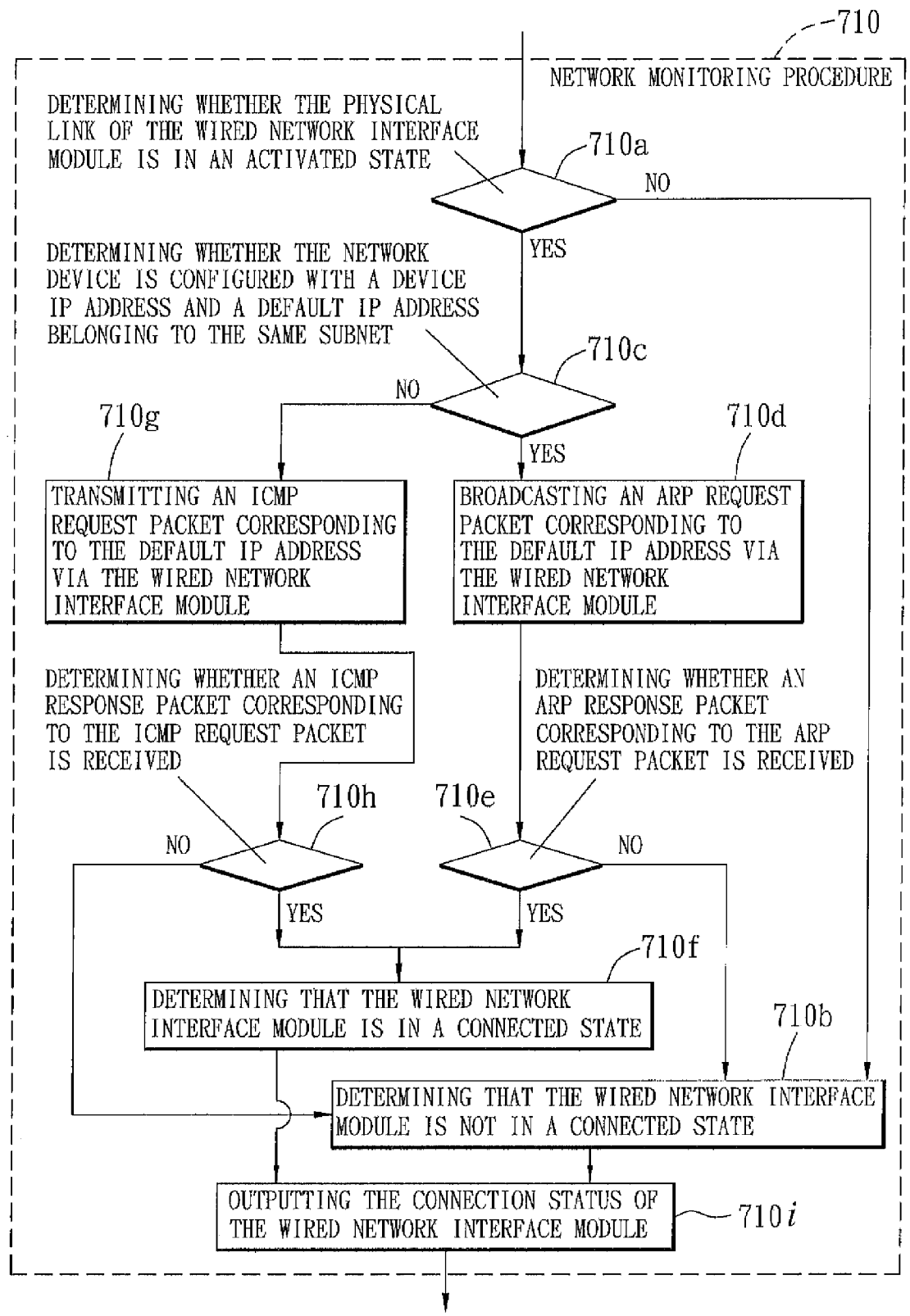
FIG. 4 is a flowchart of a network monitoring procedure of the packet transmission method of the preferred embodiment.

Wired-Priority Mode:

In step 710, the connection status monitoring unit 132 performs a network monitoring procedure including sub-steps 710a to 710i (see FIG. 4) so as to monitor the connection status of the wired network interface module 21.

In sub-step 710a, the connection status monitoring unit 132 detects a physical link status of the wired network interface module 21, proceeds to sub-step 710c if the physical link is active, and proceeds to sub-step 710b if otherwise.

In sub-step 710b, the connection status monitoring unit 132 determines that the wired network interface module 21 is not in a connected state.

In sub-step 710c, the connection status monitoring unit 132 determines whether the network device 1 is configured with a device internet protocol (IP) address and a default IP address belonging to the same subnet, proceeds to sub-step 710d is affirmative, and proceeds to sub-step 710g if otherwise.

In sub-step 710d, the connection status monitoring unit 132 broadcasts an address resolution protocol (ARP) request packet corresponding to the default IP address via the wired network interface module 21.

In sub-step 710e, the connection status monitoring unit 132 determines whether an ARP response packet corresponding to the ARP request packet is received by the network device 1, proceeds to sub-step 710f if affirmative, and proceeds to sub-step 710b if otherwise.

In sub-step 710f, the connection status monitoring unit 132 determines that the wired network interface module 21 is in a connected state.

In sub-step 710g, the connection status monitoring unit 132 transmits an internet control message protocol (ICMP) request packet corresponding to the default IP address via the wired network interface module 21.

In sub-step 710h, the connection status monitoring unit 132 determines whether an ICMP response packet corresponding to the ICMP request packet is received by the network device 1, proceeds to sub-step 710f if affirmative, and proceeds to sub-step 710b if otherwise.

In sub-step 710i, the connection status monitoring unit 132 outputs the connection status of the wired network interface module 21.

In step 711, the network interface selecting unit 133 determines whether the wired network interface module 21 is in a connected state according to the connection status outputted in sub-step 710*i*, proceeds to step 712 if affirmative, and proceeds to step 713 if otherwise.

In step 712, the network interface selecting unit 133 enables the network device 1 for packet transmission via the wired network interface module 21.

In step 713, the network interface selecting module 13 determines whether the wireless network interface module 22 is activated, proceeds to step 715 if affirmative, and proceeds to step 714 if otherwise.

In step 714, the network interface selecting module 13 activates the wireless network interface module 22 if the wireless network interface module 22 is not already activated.

In step 715, the network interface selecting unit 133 enables the network device 1 for packet transmission via the wireless network interface module 22.

In summary, when operating in the wired-priority mode, the network device 1 is enabled for packet transmission via the wired network interface module 21 when the wired network interface module 21 is in a connected state, and via the wireless network interface module 22 when the wireless network interface module 22 is in a disconnected state.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A network device adapted for transmitting packets via a wired network interface module and a wireless network interface module, said network device comprising:
    a wired network interface port adapted to be connected to the wired network interface module for enabling packet transmission between said network device and a wired network via the wired network interface module;
    a wireless network interface port adapted to be connected to the wireless network interface module for enabling packet transmission between said network device and a wireless network via the wireless network interface module; and
    a network interface selecting module including
        a connection status monitoring unit configured to detect a connection status of the wired network interface module, and
        a network interface selecting unit configured to enable said network device for packet transmission via at least one of the wireless and wired network interface modules according to the connection status as determined by said connection status monitoring unit;
    wherein:
        when said connection status monitoring unit determines that said network device is configured with a device internet protocol (IP) address and a default IP address belonging to the same subnet, said connection status monitoring unit broadcasts an address resolution protocol (ARP) request packet via the wired network interface module and determines the connection status through an ARP response packet received by said network device and corresponding to the ARP request packet; and
        when said connection status monitoring unit determines that said network device is configured with a device IP address and a default IP address that belong to different subnets, said connection status monitoring unit sends an internet control message protocol (ICMP) request packet associated with the default IP address and determines the connection status through an ICMP response packet received by said network device and corresponding to the ICMP request packet.

2. The network device as claimed in claim 1, wherein, when said connection status monitoring unit determines that said network device is configured with a device IP address and a default IP address belonging to the same subnet,
    said connection status monitoring unit determines that a network connection is established between the wired network interface module and the wired network when the ARP response packet corresponding to the ARP request packet is received by said network device, such that said network interface selecting unit enables said network device for packet transmission via the wired network interface module, and
    said connection status monitoring unit determines that the network connection is not established between the wired network interface module and the wired network when the ARP response packet corresponding to the ARP request packet is not received by said network device, such that said network interface selecting unit enables said network device for packet transmission via the wireless network interface module.

3. The network device as claimed in claim 1, wherein, when said connection status monitoring unit determines that said network device is configured with a device IP address and a default IP address belonging to different subnets,
    said connection status monitoring unit determines that a network connection is established between the wired network interface module and the wired network when the ICMP response packet corresponding to the ICMP request packet is received by said network device, such that said network interface selecting unit enables said network device for packet transmission via the wired network interface module, and
    said connection status monitoring unit determines that the network connection is not established between the wired network interface module and the wired network when the ICMP response packet corresponding to the ICMP request packet is not received by said network device, such that said network interface selecting unit enables said network device for packet transmission via the wireless network interface module.

4. The network device as claimed in claim 1, wherein said connection status monitoring unit is configured to detect a physical link status of the wired network interface module so as to determine the connection status of the wired network interface module.

5. The network device as claimed in claim 1, wherein said wireless network interface port is an Evolution-Data Optimized (EV-DO) port.

6. The network device as claimed in claim 1, wherein said network interface selecting module is operable in a wired-priority mode, in which said network interface selecting unit enables said network device for packet transmission via the wired network interface module when said connection status monitoring unit determines that a network connection is established between the wired network interface module and the wired network, and enables said network device for packet transmission via the wireless network interface module when said connection status monitoring unit determines that the network connection is not established between the wired network interface module and the wired network.

7. The network device as claimed in claim 6, wherein said network interface selecting module is further operable in a wireless-operational mode, in which said network interface selecting unit enables said network device for packet transmission via the wireless network interface module.

8. The network device as claimed in claim 6, wherein said network interface selecting module further includes a balanced-mode processor, and said network interface selecting module is further operable in a balanced-operational mode, in which said balanced-mode processor is configured to enable said network device for balanced packet load transmission through the wired network interface module and the wireless network interface module according to a load balancing algorithm and a policy routing scheme.

9. The network device as claimed in claim 8, wherein the load balancing algorithm is a weighted random algorithm.

10. The network device as claimed in claim 1, wherein the wired network is an Ethernet network.

11. A network device adapted for transmitting packets via a wired network interface module, comprising:
   a wired network interface port adapted to be connected to the wired network interface module for enabling packet transmission between said network device and a wired network via the wired network interface module; and
   a connection status monitoring unit configured to detect a connection status of the wired network interface module,
   wherein:
      when said connection status monitoring unit determines that said network device is configured with a device Internet protocol (IP) address and a default IP address belonging to the same subnet, said connection status monitoring unit broadcasts an address resolution protocol (ARP) request packet via the wired network interface module and determines the connection status through an ARP response packet received by said network device and corresponding to the ARP request packet; and
      when said connection status monitoring unit determines that said network device is configured with a device IP address and a default IP address that belong to different subnets, said connection status monitoring unit sends an internet control message protocol (ICMP) request packet associated with the default IP address and determines the connection status through an ICMP response packet received by said network device and corresponding to the ICMP request packet.

12. The network device as claimed in claim 11, wherein when said connection status monitoring unit determines that said network device is configured with a device IP address and a default IP address belonging to the same subnet,
   said connection status monitoring unit determines that a network connection is established between the wired network interface module and the wired network when the ARP response packet corresponding to the ARP request packet is received by said network device, such that packet transmission via the wired network interface module is enabled, and
   said connection status monitoring unit determines that the network connection is not established between the wired network interface module and the wired network when the ARP response packet corresponding to the ARP request packet is not received by said network device, such that packet transmission via the wired network interface module is disabled.

13. The network device as claimed in claim 11, wherein, when said connection status monitoring unit determines that said network device is configured with a device IP address and a default IP address belonging to different subnets,
   said connection status monitoring unit determines that a network connection is established between the wired network interface module and the wired network when the ICMP response packet corresponding to the ICMP request packet is received by said network device, such that packet transmission via the wired network interface module is enabled, and
   said connection status monitoring unit determines that the network connection is not established between the wired network interface module and the wired network when the ICMP response packet corresponding to the ICMP request packet is not received by said network device, such that packet transmission via the wired network interface module is disabled.

14. A packet transmission method to be implemented by a network device that is connected to a wired network via a wired network interface module and to a wireless network via a wireless network interface module, the packet transmission method comprising the steps of:
   a) configuring the network device to detect a connection status of the wired network interface module, including
      a1) when the network device is configured with a device internet protocol (IP) address and a default IP address belonging to the same subnet, configuring the network device to broadcast an address resolution protocol (ARP) request packet via the wired network interface module and to determine the connection status through an ARP response packet received by the network device and corresponding to the ARP request packet, and
      a2) when the network device is configured with a device IP address and a default IP address that belong to different subnets, configuring the network device to send an internet control message protocol (ICMP) request packet associated with the default IP address and to determine the connection status through an ICMP response packet received by the network device and corresponding to the ICMP request packet; and
   b) configuring the network device for packet transmission via at least one of the wireless and wired network interface modules according to the connection status determined in step a).

15. The packet transmission method as claimed in claim 14, wherein, in step b),
   the network device is configured for packet transmission via the wired network interface module when the network device is configured with a device IP address and a default IP address belonging to the same subnet, and it is determined in step a) that a network connection is established between the wired network interface module and the wired network through receipt by the network device of the ARP response packet corresponding to the ARP request packet, and
   the network device is configured for packet transmission via the wireless network interface module when the network device is configured with a device IP address and a default IP address belonging to the same subnet, and it is determined in step a) that the network connection is not established between the wired network interface module and the wired network through non-receipt by the network device of the ARP response packet corresponding to the ARP request packet.

16. The packet transmission method as claimed in claim 14, wherein, in step b),
   the network device is configured for packet transmission via the wired network interface module when the network device is configured with a device IP address and a default IP address belonging to different subnets, and it is determined in step a) that a network connection is established between the wired network interface module and the wired network through receipt by the network device of the ICMP response packet corresponding to the ICMP request packet, and the network device is configured for packet transmission via the wireless network interface module when the network device is configured with a device IP address and a default IP address belonging to different subnets, and it is determined in step a) that the network connection is not established between the wired network interface module and the wired network through non-receipt by the network device of the ICMP response packet corresponding to the ICMP request packet.

17. The packet transmission method as claimed in claim 14, wherein, in step a), a physical link status of the wired network interface module is detected so as to determine the connection status of the wired network interface module.

18. The packet transmission method as claimed in claim 14, further comprising, prior to step a), the steps of i) determining an operating mode of the network device, and ii) proceeding to step a) when the operating mode is a wired-priority mode, wherein, in the wired-priority mode, packet transmission via the wired network interface module is enabled when it is determined in step a) that a network connection is established between the wired network interface module and the wired network, and packet transmission via the wireless network interface module is enabled when it is determined in step a) that the network connection is not established between the wired network interface module and the wired network.

19. The packet transmission method as claimed in claim 18, further comprising the step of enabling packet transmission via the wireless network interface module when the operating mode determined in step i) is a wireless-operational mode.

20. The packet transmission method as claimed in claim 18, further comprising the step of enabling balanced packet load transmission through the wired network interface module and the wireless network interface module according to a load balancing algorithm and a policy routing scheme when the operating mode determined in step i) is a balanced-operational mode.

21. The packet transmission method as claimed in claim 20, wherein the load balancing algorithm is a weighted random algorithm.

22. The packet transmission method as claimed in claim 14, wherein the wired network is an Ethernet network.

* * * * *